(No Model.) 3 Sheets—Sheet 1.
E. K. HAYES.
COMBINED CHECK ROWER AND DRILL CORN PLANTER.
No. 559,892. Patented May 12, 1896.
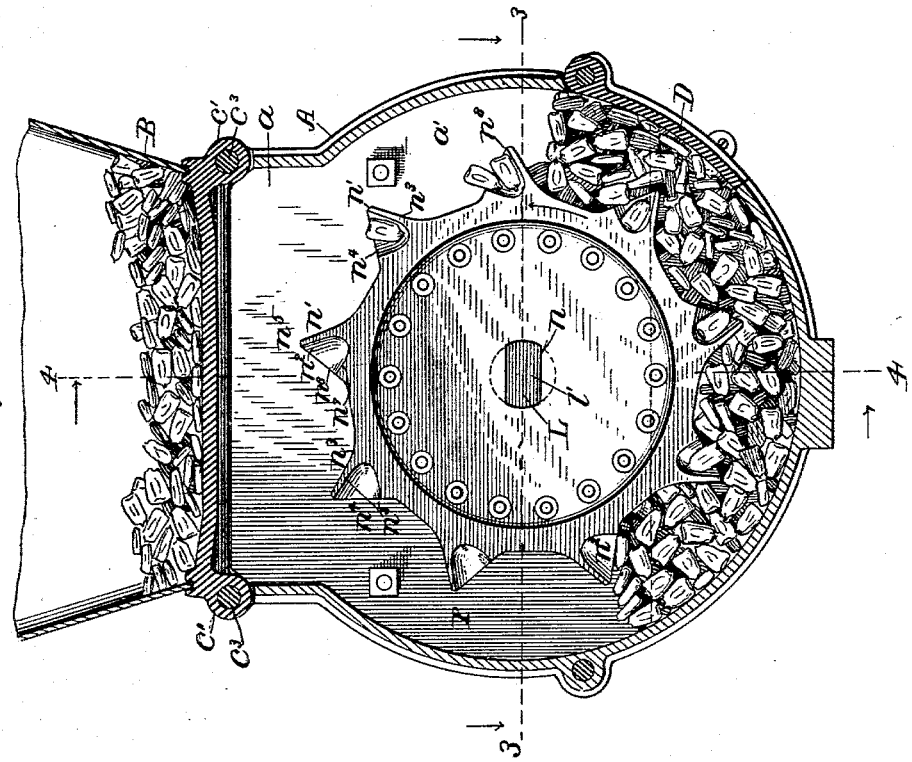
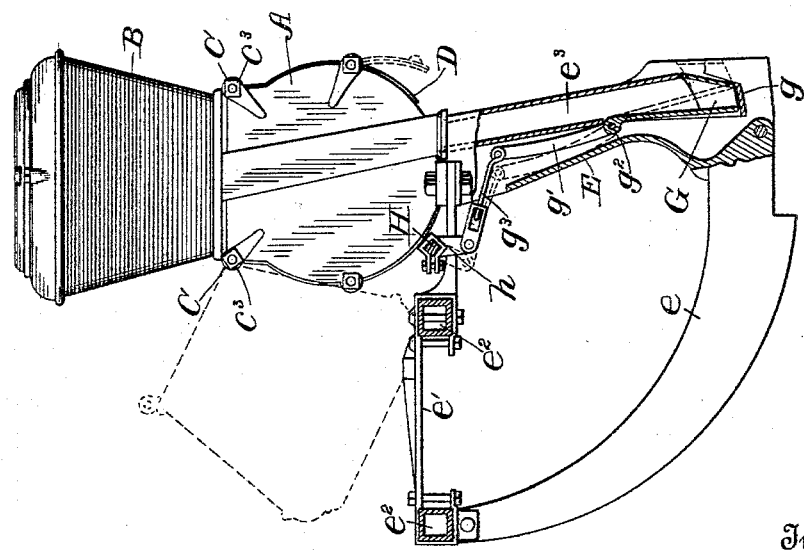
Witnesses
Inventor
E. K. Hayes,
By W. B. Richards,
Attorney (No Model.) 3 Sheets—Sheet 2.
E. K. HAYES.
COMBINED CHECK ROWER AND DRILL CORN PLANTER.
No. 559,892. Patented May 12, 1896.
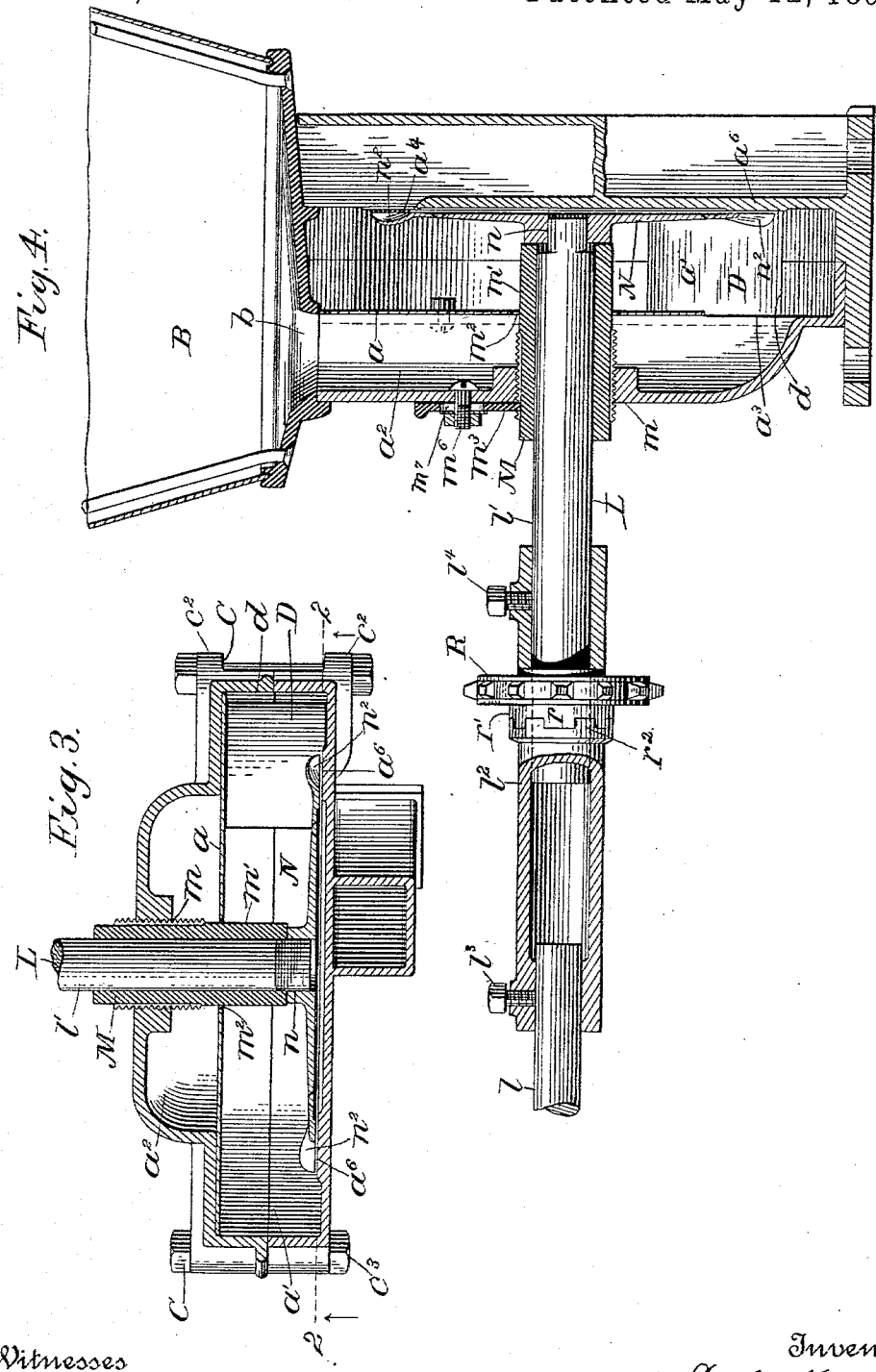

(No Model.)   3 Sheets—Sheet 3.
E. K. HAYES.
COMBINED CHECK ROWER AND DRILL CORN PLANTER.
No. 559,892. Patented May 12, 1896.
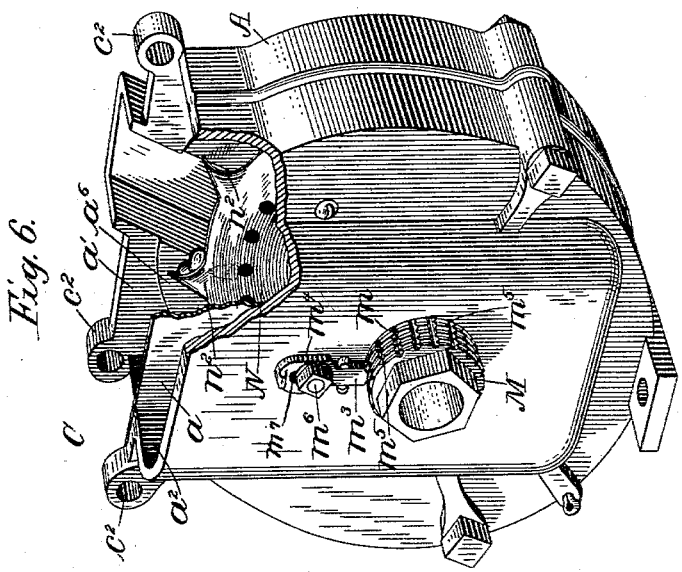
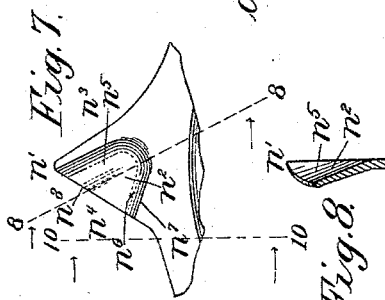
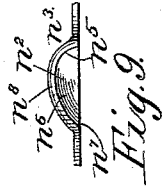
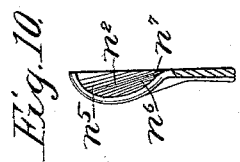
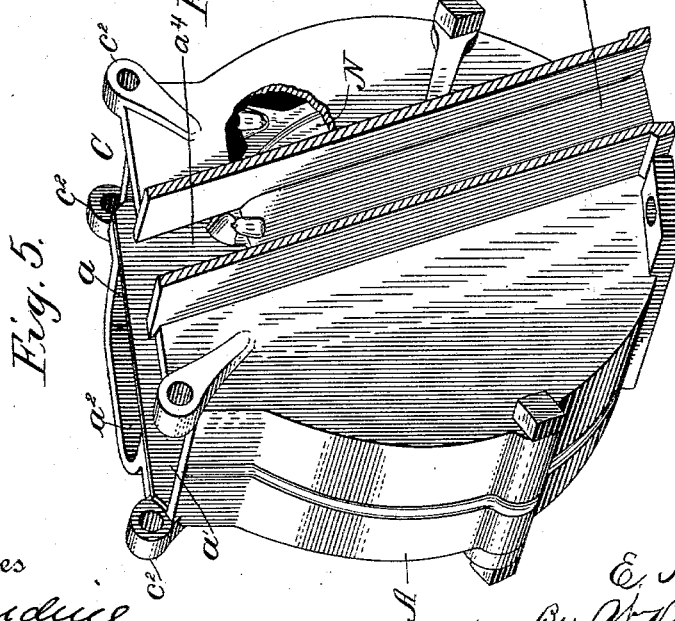
Witnesses
C. C. Burdick
Arthur Pennington
Inventor
E. K. Hayes,
By W. B. Richards,
Attorney

UNITED STATES PATENT OFFICE.

EUGENIO K. HAYES, OF GALVA, ILLINOIS.

COMBINED CHECK-ROWER AND DRILL CORN-PLANTER.

SPECIFICATION forming part of Letters Patent No. 559,892, dated May 12, 1896.

Application filed February 10, 1894. Serial No. 499,803. (No model.)

*To all whom it may concern:*

Be it known that I, EUGENIO K. HAYES, a citizen of the United States, residing at Galva, in the county of Henry and State of Illinois, have invented certain new and useful Improvements in a Combined Check-Rower and Drill Corn-Planter, of which the following is a specification.

The combined check-rower and drill corn-planter to which the invention that is herein described pertains is of that general class or type in which a seed-cup wheel or disk is rotated in a vertical plane by intergear with the planter-wheels, and which seed-cup wheel or disk is provided with means for separating single grains of seed from a mass or supply of seed, elevating them and then delivering them to the seed-tube for direct discharge therefrom for drill-planting, or for discharge therefrom by a detaining-valve in hills for check-row planting.

It has long been known that the most efficient seed-cup for separating single grains of seed from a source of supply or mass was a seed-cup formed of a tapering groove, of curved form in its cross-section; and the leading object of my present invention is to provide a seed-cup disk which, while of the most simple form and construction and very economic of manufacture, has seed-cups of such form and so disposed and arranged as to favor the entrance to each seed-cup of only a grain of seed as it is swept through the supply, and which are each so disposed and arranged as to cause it with the greatest efficiency to retain such grain of seed while elevating it, and which are also so arranged and disposed that they will with the greatest certainty and without a cut-off discharge all surplus grains from their mouths back into the supply, and that they will discharge the single grain of seed from one side of the seed-cup.

To the end of carrying out this leading object of my invention my improvements consist in a seed-cup disk rotatable substantially in a vertical plane and provided with seed-cups formed of tapering grooves in its periphery, between which seed-cups the outer part of the disk is cut away to facilitate the entrance of a grain of seed thereto, and which seed-cups are so disposed and arranged as to insure the entrance to each cup of a grain of seed as it sweeps through the mass or supply, to insure its being retained in the seed-cup as it is elevated thereby, to insure the discharge of surplus seed without a cut-off, and to discharge the grain of seed from one side of the seed-cup.

A further object of the invention is to provide an improved chamber for the seed-cup wheel, a seed-box hinged to said chamber, and improved means for mounting and adjusting the seed-cup wheel; and to the end of carrying out these objects my improvements consist in constructions and combinations hereinafter described, and made the subject-matter of claims hereto appended.

Other objects of my invention are hereinafter described, and the constructions and combinations for carrying out the different objects thereof, and in which my improvements consist, are all hereinafter described, and made the subject-matter of claims hereto appended.

Mechanism embodying the preferred construction, arrangement, disposition, and combination of the different parts and the adjacent parts of an ordinary corn-planter, in which my improvements are incorporated, are illustrated in the accompanying drawings, in which—

Figure 1 is a side elevation of the seed-box, the chamber for the seed-cup disk, and an elevation, partly in section, of parts of the forward frame of the planter, the tubulated standard and lower valve or seed-detaining valve in section; Fig. 2, a sectional elevation of the seed-box and chamber for the seed-cup disk in line 2 2 in Fig. 3; Fig. 3, a sectional plan in the line 3 3 in Fig. 2; Fig. 4, a sectional elevation in the line 4 4 in Fig. 2; Fig. 5, a perspective of the chamber for the seed-cup disk, partly broken away, part of the seed-cup disk, and the upper part of the seed-tube with its outer side removed; Fig. 6, a perspective of the chamber for the seed-cup disk seen from the opposite side from that side shown at Fig. 5 and partly broken away to show the seed-cup disk and its operation; Fig. 7, an enlarged elevation of a seed-cup and adjacent part of a seed-cup disk; Fig. 8, a sectional elevation in the line 8 8 in Fig. 7; Fig. 9, a plan of a seed-cup seen in the direction of the upper end of the line 8 8 in Fig.

7; Fig. 10, a sectional plan of a seed-cup in the line 10 10 in Fig. 7.

The chamber A, located below the seedbox B, is divided from front to rear by a vertical partition-plate $a$ into a chamber $a'$ for the seed-cup disk and a feed-chamber or spout $a^2$. The partition $a$ does not extend to the lower part of the chamber A, and thus leaves an opening or aperture $a^3$ for the free passage of seed from the feed-chamber $a^2$ to the chamber $a'$. The seedbox B has an opening $b$ in one side of its bottom which registers with the upper end of the feed-chamber or spout $a^2$, and through this opening the seed pass to the spout $a^2$, and thence, through the opening $a^3$, feed to the chamber $a'$ in such manner as to keep the lower part of the chamber $a'$ supplied with seed, as shown at Fig. 2.

The seedbox B is secured above the chamber A by means of hinges C at opposite sides of the box. These hinges are each formed of a tube $c'$, fixed to the seedbox and seated between ears $c^2$, fixed to the chamber A, and a bolt $c^3$, which passes through said parts. By withdrawing either bolt $c^3$ the seedbox can be turned backwardly and downwardly on the other hinge C, as shown by dot lines at Fig. 1, to permit of ready and easy access to the chamber A for seating or removing the seed-cup disks, hereinafter described, or for other purposes. To provide for drawing off the seed from the chamber A $a'$, spout $a^2$, and seedbox B a valve D is hinged to the chamber A over an opening $d$ in the lower part of one side of said chamber, so that it may be closed, as shown best at Figs. 1 and 2, to retain the seed, or swung open, as shown by dot lines at Fig. 1, to uncover the opening $d$ for the escape of the seed from the chamber A $a'$ and spout $a^2$ when it is desired to remove the seed from such parts for access to the seed-cup disks for the purpose of removal of said disks and substitution of others or for the removal of debris or for other purposes.

The chamber A is mounted on the tubulated standard E, which, together with the runner $e$, bar $e'$, and transverse bars $e^2$, constitute parts of an ordinary forward frame of a corn-planter. The valve G, consisting of a hollow tube, square in its cross-section, is seated in its normal position above a fixed shelf $g$, as shown by full lines at Fig. 1, below a seed-tube $e^3$, which is located in the standard E. A valve-stem $g'$ extends upwardly from one side of the valve G, is pivoted at $g^2$ to the standard E, and is pivotally connected at its upper end by links $g^3$ with a radial arm $h$ on a rock-shaft H, which is operated, as usual, by intergear with the usual check-rower-line-carrying tappets. (Not shown.) The valve-shelf $g$ will retain the seed in the valve G until said valve is operated by the check-rower line and swung backwardly, as shown by dot lines at same figure, to discharge its contained seed, as shown and described in Letters Patent for corn-planters, No. 384,363, issued to me June 12, 1888.

The rotatable shaft L extends from the chamber A at one side of the planter to a counterpart chamber A at the other side of the planter, (not shown,) and each end of said shaft passes through and is journaled in a bearing-sleeve M, one of which is mounted in the side of each chamber A, as hereinafter described. Each end of the shaft L is flattened in its cross-section to fit loosely into an oblong aperture or slot $n$ in the seed-cup disk N, so as to rotate the seed-cup disk by the rotations of said shaft while permitting the seed-cup disk to slide freely endlong on the shaft. The shaft L is in two parts $l\ l'$, united by a sleeve $l^2$, which is secured to the adjacent ends of the parts $l\ l'$ by set-screws $l^3\ l^4$. By loosening the set-screw $l^4$ either end of the shaft L may be withdrawn from its seed-cup disk and, if desired, from the chamber A, which it enters, and by the same means the length of the shaft L may be regulated properly. A sprocket-wheel R is mounted to slide lengthwise of and to rotate with the sleeve $l^2$ and has a projecting toothed boss or hub $r'$, which engages with a similar toothed hub $r^2$ on the sleeve $l^2$ when the sprocket-wheel R is moved on the sleeve to the position shown at Fig. 4 by any suitable means, (not shown,) and is disengaged therefrom when slid in an opposite direction. The sprocket-wheel R may be intergeared with the planter wheel or wheels or axle in any ordinary manner, such that it will be rotated by said wheels or axle in an ordinary manner, and will in turn when in gear with the hub or boss $r^2$ rotate the shaft L and therewith the seed-cup disks.

Each seed-cup disk has a circular series of seed-cups $n^2$ in its side and outer surface or perimeter, which are constructed and arranged as hereinafter described, and which revolve with their open sides against a planed and flat circular track or surface $a^6$ on the inner side of one of the walls of the chamber A.

Each sleeve M is screw-threaded and screwed into an aperture $m$ in a thickened part of the wall of the chamber A, its inner and smooth end part $m'$ passing closely through a hole $m^2$ in the partition-plate $a$ to the seed-cup disk. It is very important to have means whereby the seed-cups and seed-cup disk may be permitted to yield backwardly from the track $a^6$ at a proper distance from said track to cause them to operate without binding or tightness and without too great looseness, and by means of the screw-threaded sleeve such adjustments can be made with great precision and fineness, as it can be adjusted with its inner end in position to permit of the seed-cup wheel yielding backwardly to contact therewith and thereby limit its movement in that direction. After such adjustments the sleeve M is fixed in position by a detent $m^3$, which can be slid up and down in guideways $m^4$, and the lower end of which is wedge-shaped to engage with grooves $m^5$ in the screw-threads on the sleeve M, and thereby to lock and hold said sleeve against rotation. A short stud-bolt $m^6$ projects from the chamber A outwardly through a slot $m^7$ in the detent $m^3$, by means of which said detent may be locked in or out of engagement with the sleeve M.

Inverted-V-shaped portions $n'$ of the seed-cup disk project radially from its periphery and have tapering grooves or seed-cups $n^2$ formed in one of their sides and their opposite sides curved outwardly to correspond with said grooves. One side, $n^3$, of the inverted-V-shaped projections is preferably straight and the other side, $n^4$, preferably of curved form, substantially as shown at Fig. 2. The seed cup or groove $n^2$ in each projection $n'$ is tapering, in the form of the outer surface of a section less than one-half of a cone, but preferably has one of its sides, $n^5$, that next the side $n^3$, of a greater degree of curvature in its cross-section than its side $n^6$, next the side $n^7$ of the seed cup or groove $n^2$. The apex end of each seed cup or groove $n^2$ terminates, preferably, in the disk N, below the base of the projection $n'$, in which it is located. The larger end or mouth $n^8$ of each seed cup or groove $n^2$ is outermost and terminates in the side $n^4$ of the projection $n'$. The direction of revolution of the seed-cups with their mouth ends $n^8$ forward is shown by the arrow at Fig. 2.

Each seed-cup is so disposed and arranged that its side $n^3$ is inclined upwardly toward its outer end as the seed-cup in its ascending movement passes a horizontal line through the axis of rotation of the seed-cup disk, so that a grain of seed will be with certainty retained in the seed-cup as it is elevated or carried upwardly by the seed-cup, and so disposed and arranged that when the seed-cup has reached a point in its orbital path vertically over the axis of rotation of the seed-cup disk the side $n^7$ will incline downwardly toward the apex of the seed-cup and thus retain a grain of seed with great certainty until that point in the orbit of the seed-cup has been reached and where the grain of seed will fall or slide from the seed-cup over its side $n^7$ and pass through the aperture $a^4$ into the seed-tube $a^5$, which is fixed to or cast integral with the chamber A and registers at its lower end with the seed-tube $e^3$. Should a surplus seed be carried up by a seed-cup, it will necessarily occupy a place well out toward the larger end and mouth of said seed-cup, so that it will fall from the mouth of the seed-cup back into the mass of seed in the chamber $a'$ before the seed-cup which contained it has reached the aperture $a^4$. (See Fig. 6.)

This check-rower and drill, like all of its class, is used for check-row planting by dropping charges of seed from the seed-detaining valve at the lower end of the seed-tubes by means of an actuating check-rower line intergeared with said valve or by actuating it manually by means of suitable mechanism and is adapted for drill planting by removing said valve or locking it, so as not to interfere with the single grains of seed dropping from the seed-cup disks to the furrows opened for them by the runners.

Having thus described my invention, what I claim as new, and desire to secure by Letters Patent, is—

1. In a corn-planter, and in combination substantially as hereinbefore described, a chamber, a seed-cup disk, a shaft projecting through the side of said chamber and loosely into said seed-cup disk, which it rotates, a sleeve-bearing for said shaft, which sleeve-bearing is screw-threaded and passes through a screw-threaded hole in the wall of said chamber, whereby it may be adjusted toward or from the seed-cup disk for adjustments of said disk, and means for locking or fixing said sleeve after such adjustments thereof.

2. In a corn-planter, and in combination substantially as hereinbefore described, a chamber A, a seed-cup disk N rotatable therein by means of a shaft L which projects through the side of the chamber A, a sleeve-bearing M for said shaft, which sleeve-bearing is screw-threaded and passes through a screw-threaded hole in the wall of said chamber, whereby it may be adjusted toward or from the seed-cup disk, a slotted detent vertically adjustable in ways on the side of said chamber, its lower wedge-shaped end adapted to engage with grooves in the screw-threads of said sleeve, lengthwise thereof, and a bolt fixed to said chamber, passed through the slot in the detent and provided with a locking-nut.

3. The herein-described seed-cup disk, comprising in its structure a disk with inverted-V-shaped parts projecting radially therefrom, having seed-cups in said projecting parts, formed of tapering grooves of curved form in their cross-sections, and the larger end or mouth of which terminates in one of the inclined sides of the inverted-V-shaped projections.

4. The herein-described seed-cup disk, comprising in its structure a disk with inverted-V-shaped parts projecting radially therefrom, having seed-cups in such projecting parts, formed of tapering grooves of curved form in their cross-sections, the larger ends or mouths of which seed-cups or grooves terminate in one of the inclined sides of the inverted-V-shaped projections, and which grooves are arranged with their sides $n^3$ projecting substantially as hereinbefore described.

5. The herein-described seed-cup disk, comprising in its structure a disk with inverted-V-shaped parts projecting radially therefrom, having seed-cups in such projecting parts, formed of tapering grooves of curved form in their cross-sections, the larger ends or mouths of which seed-cups or grooves terminate in one of the inclined sides of the inverted-V-shaped projections, and which grooves are arranged with their sides $n^7$ projecting substantially as hereinbefore described.

6. In a corn-planter, and in combination substantially as hereinbefore described, a seed-cup disk comprising in its structure a disk with inverted-V-shaped parts projecting radially therefrom, having seed-cups in such projecting parts formed of tapering grooves, of curved form in their cross-sections, the larger ends or mouths of which grooves or seed-cups terminate in one of the inclined sides of the inverted-V-shaped projections, a circular track with a flat surface near to which said seed-cups revolve, and an aperture through which they deliver seed to the seed-tubes without the intervention of a cut-off.

7. In a corn-planter, and in combination substantially as hereinbefore described, a seedbox, a chamber located beneath said seedbox and divided by a partition into two divisions communicating at their lower parts, and one of them communicating with the interior of the seedbox, and a seed-cup disk rotatably mounted in the other compartment or division.

In testimony whereof I affix my signature in presence of two witnesses.

EUGENIO K. HAYES.

Witnesses:
H. M. RICHARDS,
L. M. RICHARDS.